United States Patent
Midorikawa et al.

(10) Patent No.: US 10,078,301 B2
(45) Date of Patent: Sep. 18, 2018

(54) IMAGE FORMING APPARATUS, FOREIGN OBJECT DETECTING SYSTEM, AND METHOD FOR PRODUCING FOREIGN OBJECT DETECTING SYSTEM

(71) Applicants: Ruki Midorikawa, Kanagawa (JP); Shogo Terakawa, Osaka (JP); Tetsuji Nishikawa, Kanagawa (JP); Hiroshi Ishii, Kanagawa (JP); Kohta Takenaka, Kanagawa (JP); Hiroaki Murakami, Tokyo (JP); Hidehiko Maeda, Tokyo (JP); Gaku Hosono, Kanagawa (JP)

(72) Inventors: Ruki Midorikawa, Kanagawa (JP); Shogo Terakawa, Osaka (JP); Tetsuji Nishikawa, Kanagawa (JP); Hiroshi Ishii, Kanagawa (JP); Kohta Takenaka, Kanagawa (JP); Hiroaki Murakami, Tokyo (JP); Hidehiko Maeda, Tokyo (JP); Gaku Hosono, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/407,764

(22) Filed: Jan. 17, 2017

(65) Prior Publication Data
US 2017/0235264 A1   Aug. 17, 2017

(30) Foreign Application Priority Data
Jan. 18, 2016 (JP) ................. 2016-007057

(51) Int. Cl.
*G03G 15/00* (2006.01)
*G03G 21/00* (2006.01)

(52) U.S. Cl.
CPC ............. *G03G 15/50* (2013.01); *G03G 21/00* (2013.01)

(58) Field of Classification Search
None
See application file for complete search history.

(56) References Cited

U.S. PATENT DOCUMENTS 4,814,821 A * 3/1989 Sawayama ......... G03G 15/0126
                                                    399/111
4,973,993 A    11/1990 Allen
(Continued)

FOREIGN PATENT DOCUMENTS

CN    101078858 A    11/2007
CN    103716484 A    4/2014
(Continued)

OTHER PUBLICATIONS

European Search Report; Appl 17151833.5-1568; dated Aug. 16, 2017.
(Continued)

*Primary Examiner* — Victor Verbitsky
(74) *Attorney, Agent, or Firm* — Duft Bornsen & Fettig LLP (57) ABSTRACT

An image forming apparatus includes an apparatus body accommodating an image forming device, a foreign object detector that detects a foreign object beside the apparatus body, and a detector holding unit that holds the foreign object detector. The foreign object detector and the detector holding unit are movable together into the apparatus body.

13 Claims, 9 Drawing Sheets (56) References Cited

U.S. PATENT DOCUMENTS

2008/0007847 A1* 1/2008 Koyama ................. G03B 5/00
                                                    359/817
2015/0103365 A1* 4/2015 Baba ................. H04N 1/00323
                                                    358/1.13

FOREIGN PATENT DOCUMENTS

| CN | 104580795 A | 4/2015 |
| CN | 105121315 A | 12/2015 |
| JP | 6-121080 | 4/1994 |
| JP | 2006-015495 | 1/2006 |
| JP | 2012006718 A | 1/2012 |

OTHER PUBLICATIONS

Chinese Office Action; Application No. 201710037195.0; dated Aug. 3, 2018.

* cited by examiner

IMAGE FORMING APPARATUS, FOREIGN OBJECT DETECTING SYSTEM, AND METHOD FOR PRODUCING FOREIGN OBJECT DETECTING SYSTEM

CROSS-REFERENCE TO RELATED APPLICATION

This patent application is based on and claims priority pursuant to 35 U.S.C. § 119(a) to Japanese Patent Application No. 2016-007057 filed on Jan. 18, 2016 in the Japan Patent Office, the entire disclosure of which is hereby incorporated by reference herein.

BACKGROUND

Technical Field

This disclosure relates to an image forming apparatus and a foreign object detecting system having a foreign object detector to detect either a person or a foreign object existing outside the image forming apparatus, and a method for producing the foreign object detecting system.

Related Art

In a known image forming apparatus, to detect an operator standing in front of the image forming apparatus or a foreign object disposed in front of the image forming apparatus (hereinafter collectively referred to as a person) a person detector is disposed on a front side of a apparatus body of the image forming apparatus (hereinafter simply referred to as an apparatus body). A person detecting system including the person detector is fixed to and is exposed from an exterior of the apparatus body as a fixed type person detecting system. The known person detecting system is sometimes placed above a toner supplying section in the apparatus body.

SUMMARY

According to one embodiment of the present disclosure, an image forming apparatus includes an apparatus body to accommodate an image forming device, a foreign object detector to detect a foreign object beside the apparatus body, and a detector holding unit to hold the foreign object detector. The foreign object detector and the detector holding unit are movable together into the apparatus body in a prescribed direction.

According to another embodiment of the present disclosure, a foreign object detecting system includes a foreign object detector to detect a foreign object beside the foreign object detecting system, and a detector holding unit to hold the foreign object detector. The foreign object detector and the detector holding unit are movable together to a rear side of the foreign object detecting system. The foreign object detecting system also includes a fixing member to fix the foreign object detecting system to another system and an elastic member to press the detector holding unit from the rear side of the detector holding unit toward a front side of the foreign object detecting system. The detector holding unit includes an elastic portion in the rear side of the detector holding unit to press against the foreign object detector toward the front side of the foreign object detecting system.

According to yet another embodiment of the present disclosure, a method of producing a foreign object detecting system includes the steps of sandwiching a foreign object detector between a front side holder and a rear side holder, positioning the foreign object detector in first and second directions of coordinate axes in the front side holder, and coupling the front side holder and the rear side holder to each other to constitute a detector holding unit while positioning the foreign object detector in a third direction of a coordinate axis. The method further including the steps of fastening the front side holder and the rear side holder from a rear side of the rear side holder, inserting a stepped screw having a diameter being smaller in a range toward a bottom of the stepped screw to form a longitudinal slope, through which the detector holding unit can move, into each of a compression coil spring and the detector holding unit, and fastening the detector holding unit to a fixing member while pressing the detector holding unit with the compression coil spring against the fixing member.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

Referring now to the drawings, wherein like reference numerals designate identical or corresponding member throughout the several views of the drawings.

Since a conventional person detector is directly implemented on a printed circuit board, the conventional person detector of the fixed type is vulnerable to external impact. For example, when an operator replaces used toner with fresh toner and accidentally strikes the person detector, an internal printed circuit board can be broken sometimes.

The related art simply discusses a technique of writing of data stored in a memory into a RFID (Radio Frequency Identifier) tag is stopped when a person is detected by a person detector to avoid destruction of the RFID tag, because the destruction of the RFID tag generally occurs either when power is turned off or parts are replaced by an operator.

However, a problem of destruction of the person detector caused by the external impact is neither addressed nor resolved.

That is, when an outside to an apparatus body (i.e., the person detecting system) of the image forming apparatus (herein after simply referred to as an apparatus body) is subjected to an external impact, a detector holding unit that holds a detector mounted printed circuit board thereon and constitutes the person detecting system moves into the image forming apparatus to avoid damage possibly caused to the detector mounted printed circuit board, for example, when an old toner cartridge is replaced by an operator with a new toner cartridge and the operator accidentally strikes a person detecting system.

With this, the old toner cartridge can be safely replaced with the new toner cartridge by an operator without damaging the detector mounted printed circuit board even if he or she applies the impact to the person detecting system.

In the past, however, the detector mounted printed circuit board is restricted by the apparatus body through a board holder that holds the detector mounted printed circuit board, and accordingly cannot move into the image forming apparatus when the impact is applied from an outside. Hence, the conventional detector mounted printed circuit board is readily affected by the external impact of the apparatus body.

By contrast, however, according to one embodiment of the present disclosure, since the detector holding unit employs a spring and is movable to and from a fixed member fixed to the apparatus body, the detector holding unit can be free from the restriction of the apparatus body even when impact greater than pressure of the spring is applied from the outside of the apparatus body. Hence, since the detector holding unit with the detector mounted printed circuit board is movable to and from the apparatus body, the detector mounted printed circuit board can avoid from receiving influence of the external impact. Accordingly, used up toner can be safely replaced with fresh toner without damaging the detector mounted printed circuit board.

Figure 1:
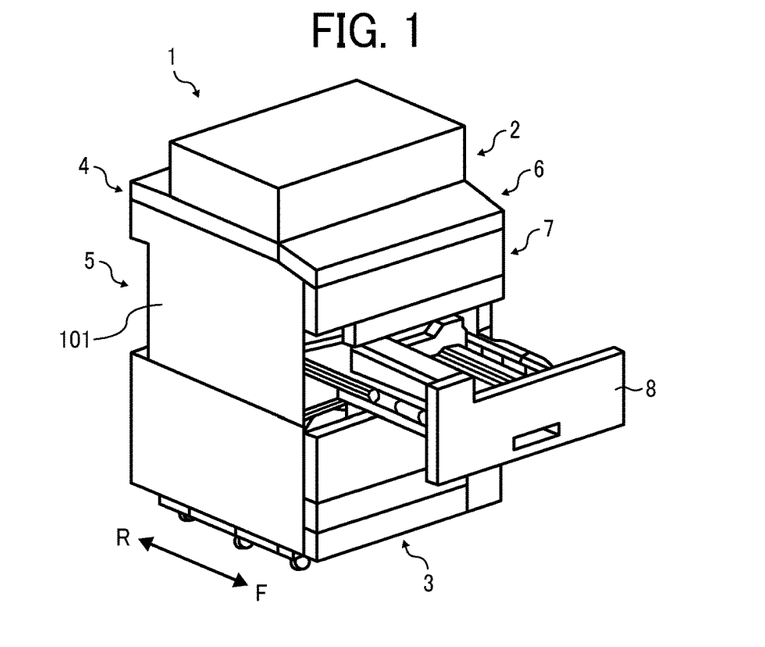
FIG. 1 is a perspective view schematically illustrating an exemplary configuration of an image forming apparatus, in which one embodiment of the present disclosure is implemented, according to one embodiment of the present disclosure.

Now, various embodiments of the present disclosure are herein below described in detail with reference to the several views of the drawings, and in particular to FIG. 1, an image forming apparatus 1 according to one embodiment of the present disclosure is initially described briefly. FIG. 1 is a perspective view schematically illustrating an exemplary configuration of the image forming apparatus 1 according to one embodiment of the present disclosure. As shown there, the image forming apparatus 1 includes an automatic original document feeder (hereinafter simply referred to as an ADF) 2 and an apparatus body 101 that accommodates a paper sheet feeding unit 3 or the like. Beside the paper sheet feeding unit 3, the apparatus body 101 includes an image reading unit 4, an image forming unit 5, and an operation unit 6 as well. The apparatus body 101 also includes a toner supply unit 7 having a front door as described later in detail and a drawing unit 8 each disposed on a front side of the image forming unit 5 as shown by arrow F. The operation unit 6 placed above the image forming unit 5 includes a base plate described later in detail, an upper cover 12 (see FIGS. 7 and 8) including an operating panel, and a person detecting system 100 (see FIGS. 2 to 4) mounted on the base plate. Here, in FIG. 1, arrow F represents a front side of the image forming apparatus 1. By contrast, arrow R represents a rear side of the image forming apparatus 1.

Figure 2:
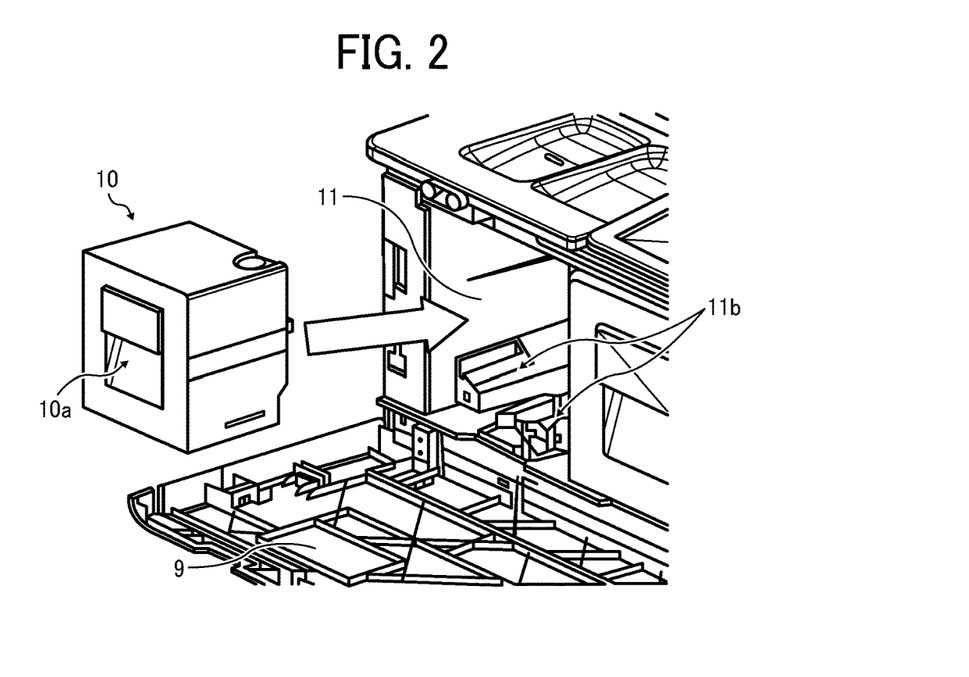
FIG. 2 is a perspective view schematically illustrating exemplary arrangement and a configuration of both a toner supplying section and a person detecting system when a front door is opened according to one embodiment of the present disclosure.
Figure 3:
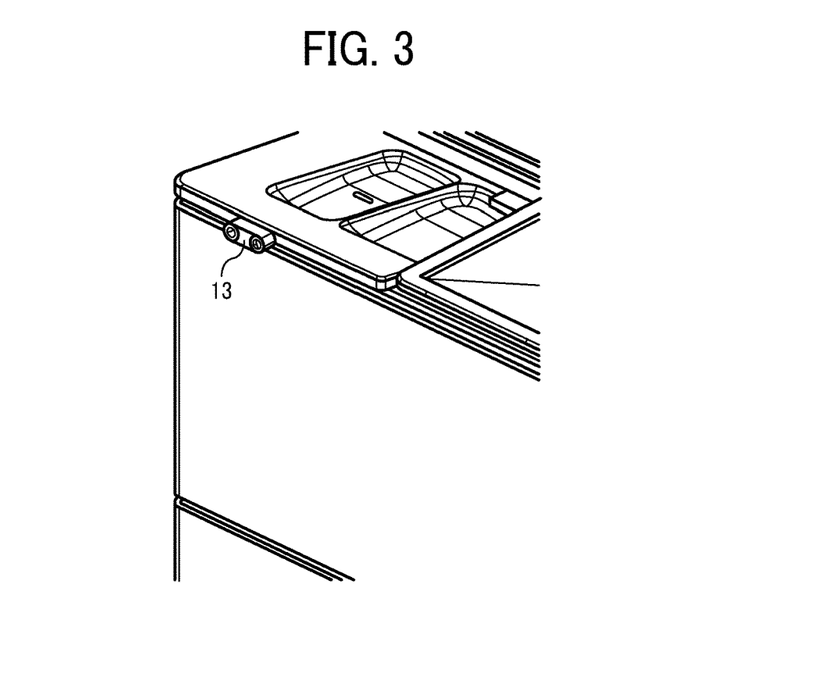
FIG. 3 is also a perspective view schematically illustrating the exemplary arrangement and the configuration of both of a toner supplying section and a person detecting system when the front door is closed according to one embodiment of the present disclosure.

Now, the toner supply unit 7 and the person detecting system 100 are described in detail with reference to FIGS. 2 and 3. FIGS. 2 and 3 are perspective views collectively illustrating exemplary arrangement of the toner supply unit 7 and the person detecting system 100. The toner supply unit 7 includes a front door 9, a toner cartridge 10, and a toner cartridge storage 11. To replace old toner, the front door 9 is opened from the apparatus body 101 to the front side by swinging the front door 9 by the angle of about 90 degrees and a handle 10a of the toner cartridge 10 to be replaced is held and is drawn out toward the front side F of the apparatus body 101. Subsequently, a new toner cartridge is inserted into the apparatus body 101 toward the rear side R of the apparatus body 101 along a rail unit 11b disposed in the toner cartridge storage 11 and is installed in the apparatus body 101 as shown in FIG. 2.

Figure 4:
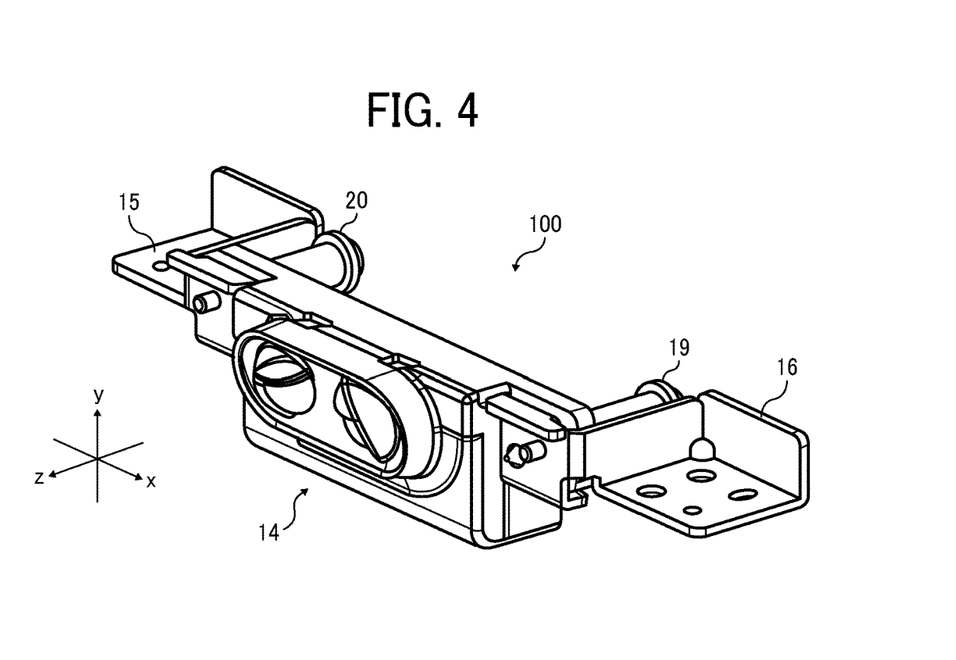
FIG. 4 is a perspective view schematically illustrating exemplary appearance of the person detecting system according to one embodiment of the present disclosure.

Now, an exemplary person detecting system 100 is described in detail with reference to FIGS. 4 and 5. As shown in FIG. 4, to concisely describe the various embodiments of the present disclosure hereinafter, directions of coordinate axes x, y, and z are defined beforehand. FIG. 4 is a perspective view schematically illustrating an exemplary person detecting system 100. As shown in FIG. 3, a detecting portion 13 of a detector holding unit 14 included in the person detecting system 100 is exposed through a cutaway portion collectively formed by the upper cover 12 and the front door 9 therebetween when the front door 9 of the toner supply unit 7 is closed. The person detecting system 100 is placed above the toner cartridge 10.

Hence, when the front door 9 of the toner supply unit 7 is opened to replace old toner, since a gap between the top of the toner cartridge 10 installed in the apparatus body 101 and a bottom surface of the person detecting system 100 is narrow, the toner cartridge 10 has a risk to contact (and damage) the person detecting system 100 when the toner cartridge 10 is manually inserted into the toner cartridge storage 11. To avoid the damage, the detector holding unit 14 of the person detecting system 100 is configured to be movable when the toner cartridge 10 accidentally contacts the detector holding unit 14 (as also described later in greater detail).

Figure 5:
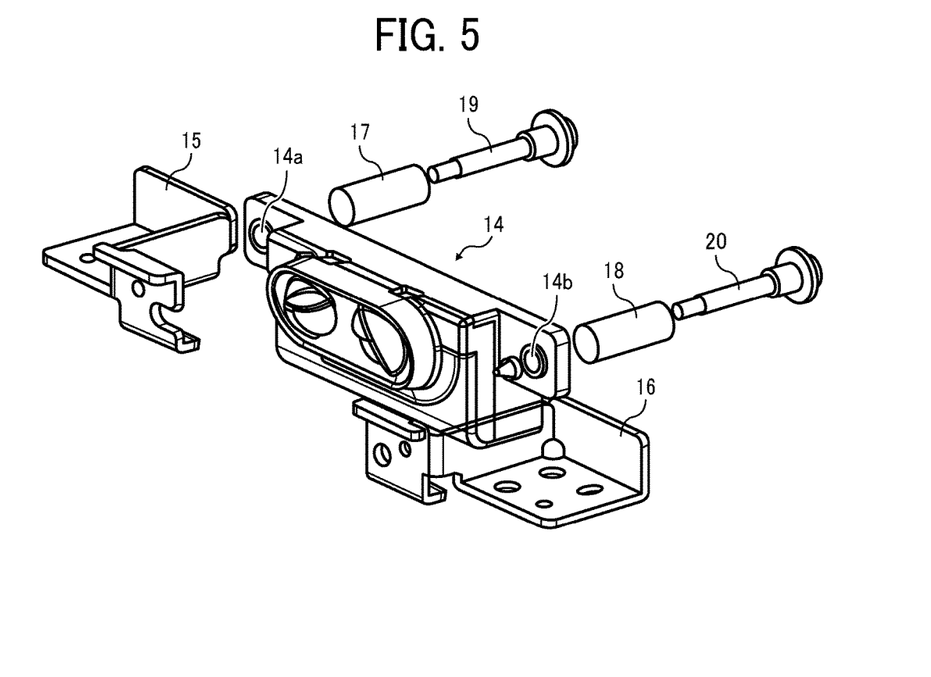
FIG. 5 is an exploded perspective view schematically illustrating the exemplary configuration of the person detecting system of FIG. 4.
Figure 6:
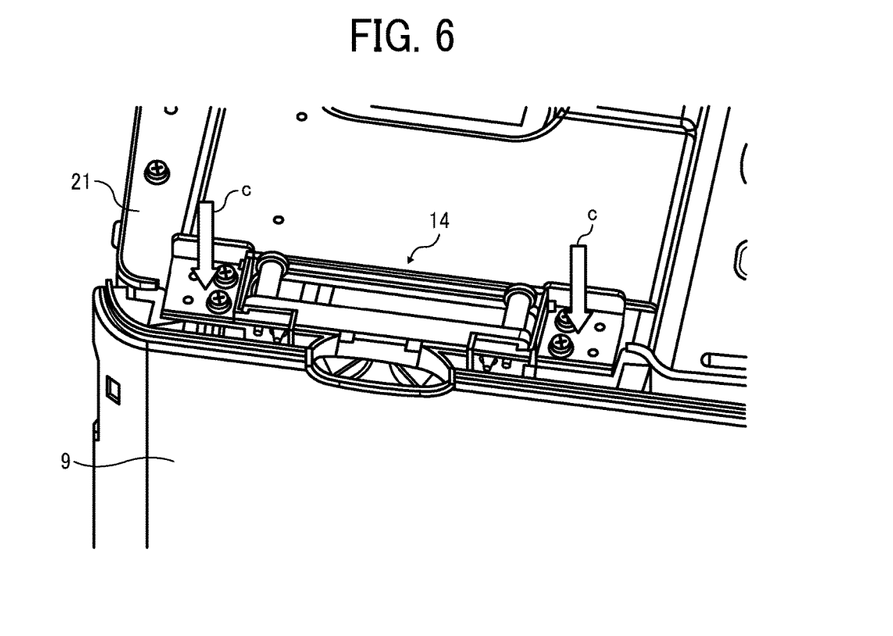
FIG. 6 is a perspective view schematically illustrating exemplary attachment of the person detecting system to a body of the image forming apparatus according to one embodiment of the present disclosure.

FIG. 5 is an exploded perspective view schematically illustrating an exemplary configuration of the person detecting system 100. FIG. 6 is also a perspective view schematically illustrating exemplary arrangement of the person detecting system 100.

As shown in FIG. 5, the person detecting system 100 includes a detector holding unit 14, a pair of fixed members 15 and 16, a pair of compression coil springs 17 and 18 serving as elastic members, and a pair of stepped screws 19 and 20. The pair of stepped screws 19 and 20 is inserted into a pair of holes 14a and 14b formed in the detector holding unit 14 while penetrating the pair of compression coil springs 17 and 18 and are pressed against and attached to the pair of fixed members 15 and 16, respectively. Hence, since the pair of stepped screws 19 and 20 is bound by the pair of fixed members 15 and 16 via the pair of compression coil springs 17 and 18, respectively, the detector holding unit 14 is always pressed against the fixed members 15 and 16 with a prescribed pressure.

The pair of fixed members 15 and 16 is pressed in a direction as shown by arrow c in FIG. 6 and is bound and secured to the apparatus body 101 via a base plate 21 disposed in the operation unit 6. Accordingly, when the detector holding unit 14 receives a stress that exceeds the prescribed pressure via the compression coil springs 17 and 18 from the front side, the detector holding unit 14 can move in a depth direction of the apparatus body 101. Since the fixed members 15 and 16 are separated from the apparatus body 101, the detector holding unit 14 is constituted as a unit. In addition, lower surfaces of the pair of fixed members 15 and 16 are brought in contact with an upper surface of the base plate 21 and the pair of fixed members 15 and 16 is pressed and positioned in a direction as shown by arrow c in the drawing, positioning accuracy and installation labor of the person detecting system 100 regarding the apparatus body 101 of the image forming apparatus 1 are improved.

That is, firstly, the detector holding unit 14 is rendered movable to and from the apparatus body 101 in the depth direction of the apparatus body 101. Then, the pair of compression coil springs 17 and 18 presses and attaches the detector holding unit 14 to the pair of fixed members 15 and 16, respectively. Consequently, due to elasticity of the pair of compression coil springs 17 and 18, the detector holding unit 14 can always return to a prescribed person detection position as shown in FIGS. 3 and 6.

A pair of person detectors is included in the detector holding unit 14 and is pressed against fixed members 15 and 16 as a unit. Each of the pair of person detectors keeps upright when the detector holding unit 14 is pressed against the apparatus body 101. The pair of person detectors of the detector holding unit 14 are readily connected to the apparatus body 101 by using a pair of fasteners obtained, for example, by cutting a metal plate or the like, to fix the pair of person detectors to the apparatus body 101, respectively.

Hence, since the pair of person detectors and the pair of detector holders that collectively holds the person detectors therebetween move together as the detector holding unit 14, the person detectors held in the detector holding unit 14 with pressure does not receive overload even when external impact is applied to the pair of detector holders.

Figure 7:
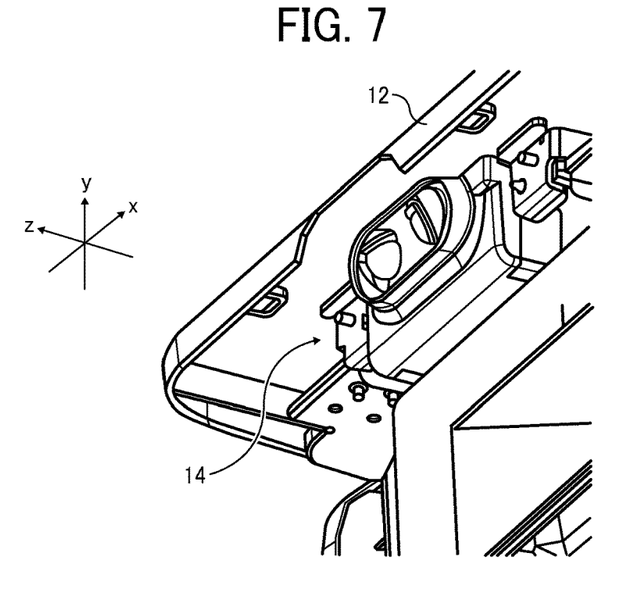
FIG. 7 is a perspective view schematically illustrating an exemplary configuration of an upper cover and the person detecting system according to one embodiment of the present disclosure.
Figure 8:
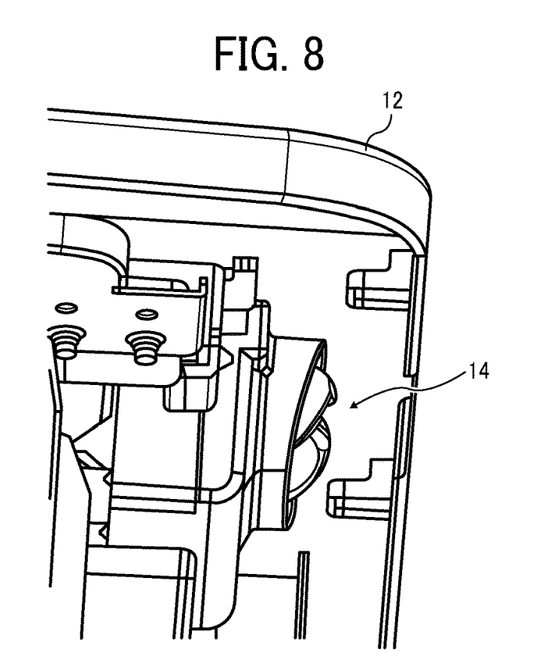
FIG. 8 is also a perspective view schematically illustrating an exemplary configuration of the upper cover and the person detecting system of FIG. 7 (when taken from a different point from that in FIG. 6)
Figure 9:
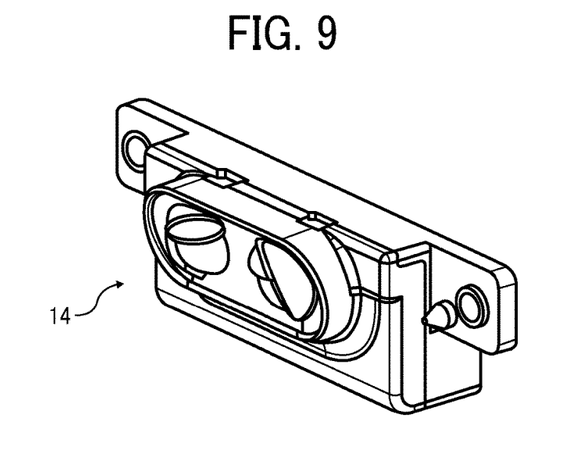
FIG. 9 is a perspective view schematically illustrating a front side of the exemplary detector holding unit according to one embodiment of the present disclosure.
Figure 10:
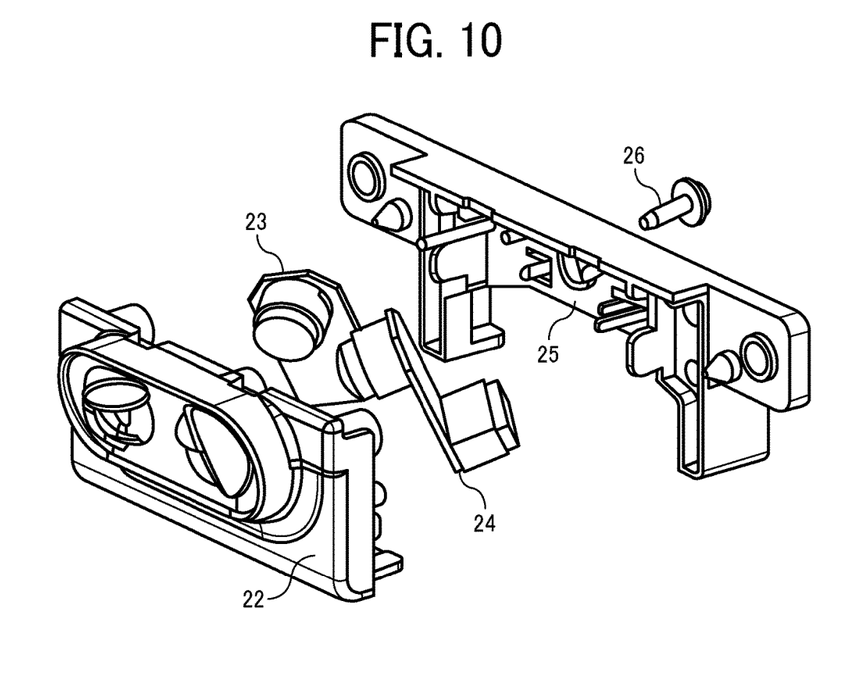
FIG. 10 is an exploded perspective view schematically illustrating the detector holding unit of FIG. 9.

Now, relative positions of an upper cover 12 and the person detecting system 100 are described in detail with reference to FIGS. 7 and 8. FIGS. 7 and 8 are perspective views collectively illustrating a position and a configuration of an exemplary upper cover and the person detecting system 100.

In addition to pressing the detector holding unit 14 against the apparatus body 101, the fixed members 15 and 16 also functions to position the upper cover 12 in a direction of a coordinate y when the upper cover 12 is attached to the apparatus body 101. That is, the upper cover 12 is attached to the apparatus body 101 by positioning nails disposed in the upper cover 12 with reference to bending portions formed in the fixed members 15 and 16, respectively. Hence, the fixed members 15 and 16 of the person detecting system 100 restricted by the base plate 21 act as references, respectively, so that positional deviation possibly caused between the upper cover 12 and the pair of detector holders can be minimized.

Now, an exemplary configuration of the detector holding unit 14 is described in detail with reference to FIGS. 9 to 12. FIGS. 9 to 12 are perspective views collectively illustrating an exemplary configuration of the detector holding unit 14 according to one embodiment of the present disclosure.

The detector holding unit 14 includes a front side holder 22, a pair of detector mounted printed circuit boards 23 and 24 acting as printed circuit boards, on which the person detectors are implemented, respectively, a rear side holder 25, and a fixing screw 26 that fastens the front side holder 22 and the rear side holder 25, and the printed circuit boards 23 and 24.

As shown therein, the detector mounted printed circuit board 23 is set to the front side holder 22 so that the person detector of the detector mounted printed circuit board 23 can fit into a hole 22A formed in the front side holder 22. At that time, a surface of the detector mounted printed circuit board 23 contacts multiple contact sections 22a, 22b, and 22c also formed in the front side holder 22. The other multiple contact sections 22d and 22e also formed in the front side holder 22 regulate movement of the detector mounted printed circuit board 23 as regulating parts as well. Accordingly, positions of the person detector of the detector mounted printed circuit board 23 are fixed in directions of coordinates x, y, and z, respectively. Similar to the detector mounted printed circuit board 23, the detector mounted printed circuit board 24 is set to the front side holder 22 so that the person detector of the detector mounted printed circuit board 24 can fit into a hole 22B symmetrically formed in the front side holder 22 as well.

Figure 11:
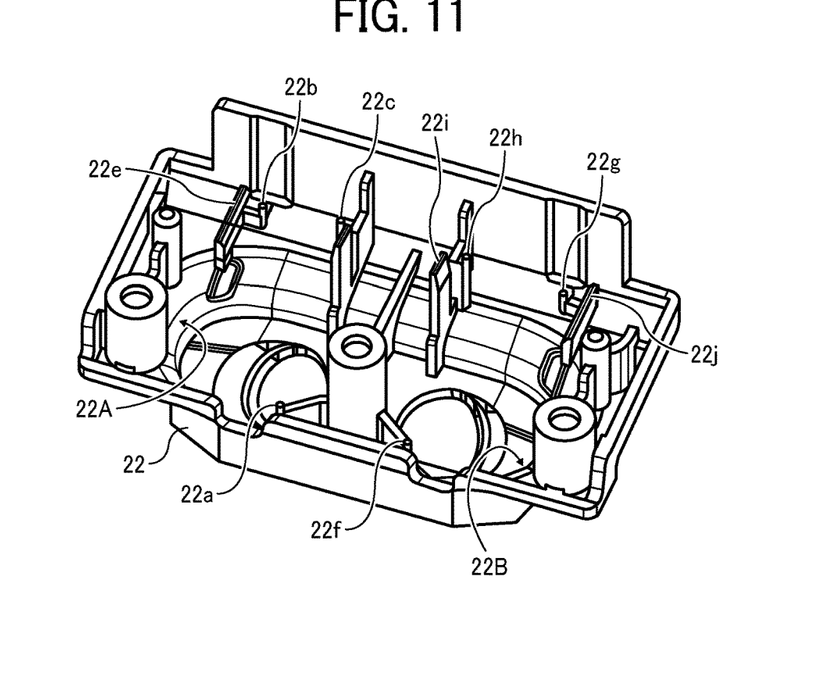
FIG. 11 is a perspective view schematically illustrating a rear side of a front side holder constituting the detector holding unit of FIGS. 9 and 10.
Figure 12:
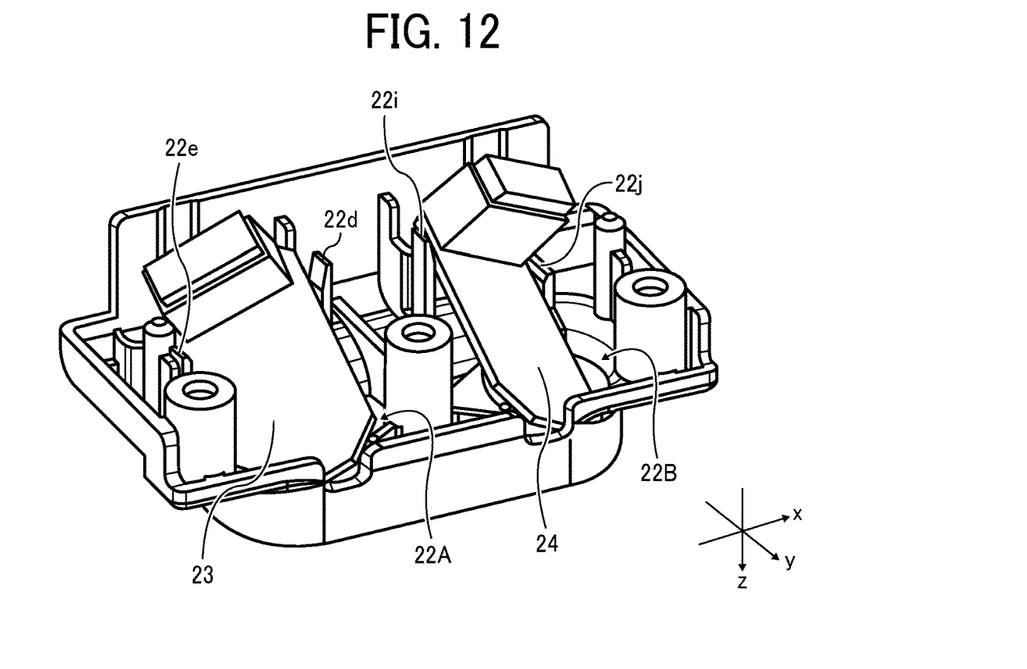
FIG. 12 is also a perspective view schematically illustrating the rear side of the front side holder of FIG. 11 when a pair of detector mounted printed circuit boards is attached to the front side holder according to one embodiment of the present disclosure.

At that time, again, a surface of the detector mounted printed circuit board 24 contacts multiple contact sections 22f, 22g, and 22h formed in the front side holder 22. The other multiple contact sections 22i and 22j similarly formed in the front side holder 22 regulate movement of the detector mounted printed circuit board 24 as regulating parts as well.

Accordingly, positions of the person detector of the detector mounted printed circuit board 24 are fixed in directions of coordinates x, y, and z, respectively.

Each of tips of the contact sections 22a, 22b, 22c, 22d, 22e, 22f, 22g, and 22h of the front side holder 22 is spherical. Hence, one of the detector mounted printed circuit boards 23 and 24 is collectively supported by three points of the tips among six points thereof. The other one of the detector mounted printed circuit boards 23 and 24 is collectively supported by three points of the other tips among six points thereof as well.

The contact sections 22e and 22j regulate movement of the detector mounted printed circuit boards 23 and 24 in the direction x, respectively. That is, when these spherical three points of the contact sections 22a, 22b, 22c, 22d, 22e, 22f, 22g, and 22h receive the detector mounted printed circuit board 23 or 24, the detector mounted printed circuit board 23 or 24 drops down by its own weight. Hence, the contact sections 22e and 22j work to stop the drop of the detector mounted printed circuit board 23 and 24 as stoppers, respectively. The detector mounted printed circuit boards 23 and 24 are attached along the introduction parts of the contact sections 22d and 22i, respectively. Hence, inserting performance of each of the detector mounted printed circuit boards 23 and 24 is improved.

When the detector mounted printed circuit boards 23 and 24 are inserted along the introduction parts of the contact sections 22d and 22i, respectively, the detector mounted printed circuit boards 23 and 24 are elastically pressed in the direction x by the contact sections 22d and 22i, respectively, due to elasticity of the contact sections 22d and 22i. When the detector mounted printed circuit boards 23 and 24 and the front side holder 22 are simply assembled, the detector mounted printed circuit boards 23 and 24 are free (i.e., nor positioned) in the direction of the coordinate z. That is, when a surface of the detector mounted printed circuit board 23 or 24, on which the person detector is implemented, is regarded as a front side and the detector mounted printed circuit board 23 or 24 is not pressed from a rear side surface thereof, the detector mounted printed circuit board 23 or 24 cannot contact the contact sections 22a, 22b, 22c, 22d, 22e, and 22f of the front side holder 22.

Figure 13:
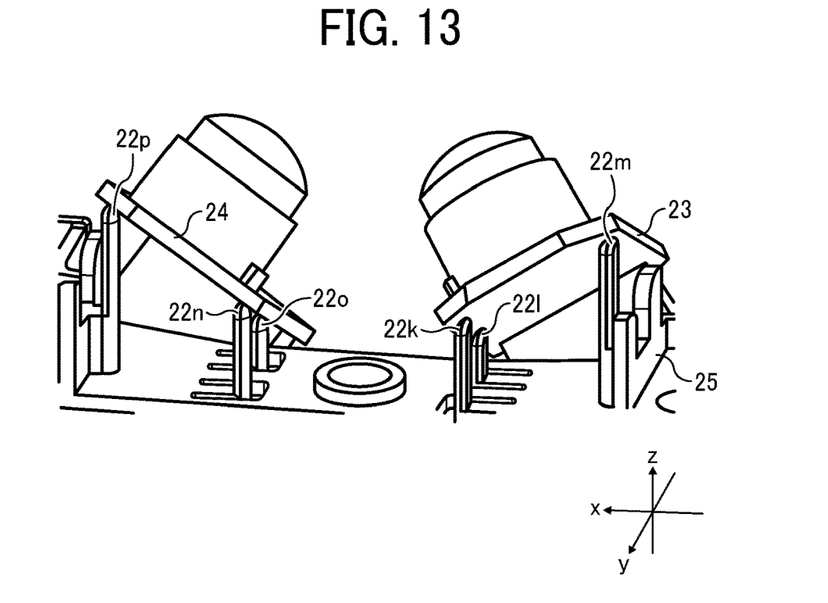
FIG. 13 is a perspective view schematically illustrating an exemplary configuration of a rear side holder constituting the detector holding unit when the detector mounted printed circuit board is set thereto according to one embodiment of the present disclosure.
Figure 14:
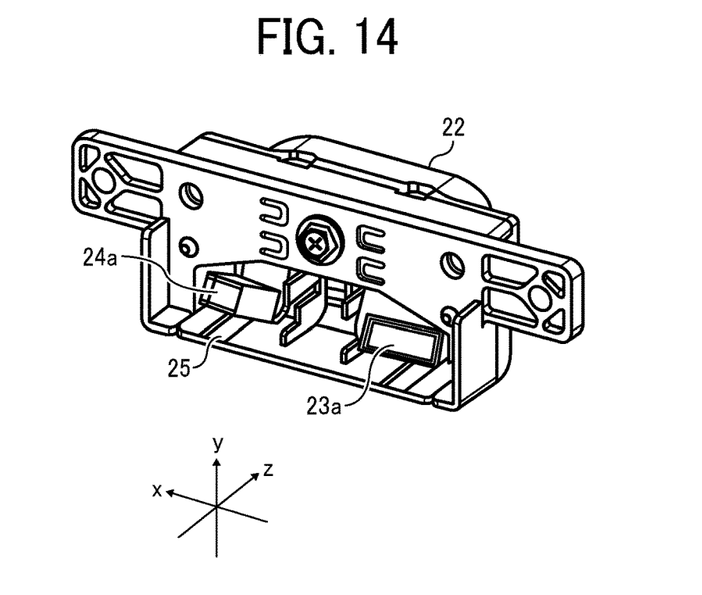
FIG. 14 is also a perspective view schematically illustrating an exemplary configuration of the detector holding unit with the detector mounted printed circuit board sandwiched therebetween (as viewed from a rear side of the detector holding unit as opposite to the view shown in FIG. 9) according to one embodiment of the present disclosure.

In view of this, a rear side holder 25 is employed and is mated with the front side holder 22 to press each of the detector mounted printed circuit boards 23 and 24 from each of rear sides thereof and bring the detector mounted printed circuit boards 23 and 24 in contact with the front side holder 22 (i.e., the contact sections 22a, 22b, 22c, 22d, 22e, and 22f of the front side holder 22 as shown in FIGS. 13 and 14).

Now, an exemplary configuration of the detector holding unit 14 and the pair of detector mounted printed circuit boards is described in detail with reference to FIGS. 13 and 14 according to one embodiment of the present disclosure.

FIGS. 13 and 14 are perspective views collectively illustrating the exemplary configuration of the detector holding unit and the pair of detector mounted printed circuit boards. As shown, the rear side holder 25 includes multiple contact sections 22k, 22l, 22m, 22n, 22o, and 22p. Each of tips of the contact sections 22k, 22l, 22m, 22n, 22o, and 22p of the rear side holder 25 is spherical again. Hence, one of the detector mounted printed circuit boards 23 and 24 is collectively supported by three points of the tips among six points thereof. The other one of the detector mounted printed circuit boards 23 and 24 is collectively supported by three points of the other tips among six points thereof as well. In other words, the right side spherical tips of the contact sections 22k, 22l, and 22m collectively press against the detector mounted printed circuit board 23. Due to elasticity of the rear side holder 25, the contact sections 22k, 22l, and 22m collectively has a function to prevent the detector mounted printed circuit board 23 from receiving an overload when pressed by the rear side holder 25. Further, a connector (e.g., a female connector) 23a is implemented on the detector mounted printed circuit board 23. A connector (e.g., a female connector) 24a is also implemented on the detect detector mounted printed circuit board 24. When a male connector is either inserted or removed to or from the female connector 23a, especially, when the male connector is detached therefrom, a load may be applied to the detector mounted printed circuit board. That is, the detector mounted printed circuit board 23 is pulled in directions −x, +y, and −z from pressing points of the contact sections 22k, 22l, and 22m, respectively. To solve such a problem, the following functions are included in the contact sections 22k, 22l, and 22m as countermeasures.

That is, bases of the contact sections 22k and 22l deflect in the direction −z when the contact sections 22k and 22l, and 22m mate with the printed circuit board 23 to prevent the printed circuit board 23 from receiving an excessive load greater than a stress originally needed in mating thereof. At the same time, the spherical tips of the contact sections 22k, 22l, and 22m deflect in the direction of the coordinate −x. Hence, the detector mounted printed circuit board 23 can be precisely pressed against the front side holder 22 without receiving damage while maintaining the position of the detector mounted printed circuit board 23. Consequently, the detector mounted printed circuit boards 23 and 24 can be held without receiving damage even when the detector mounted printed circuit boards 23 and 24 are pressed.

Further, the tips of the contact sections 22n, 22o, and 22p of the rear side holder 25 are also spherical and operate in the same way.

That is, each of the contact sections 22n, 22o, and 22p has the same function as the contact sections 22k and 22l, and 22m to prevent the detector mounted printed circuit board 24 from receiving an overload due to elasticity of the rear side holder 25 when pressed by the rear side holder 25. That is, when a mail connector is detached from a female connector 24a mounted on the detector mounted printed circuit board 24, the detector mounted printed circuit board 24 is pulled in directions of the coordinates +x, +y, and −z from pressing points of the contact sections 22n, 22o, and 22p.

To solve such a problem, the following functions are included in the contact sections 22n, 22o, and 22p again, as countermeasures.

That is, bases of the contact sections 22n and 22o deflect in the direction of the coordinate −z. At the same time, the spherical tips of the contact sections 22n, 22o, and 22p deflect in the direction of the coordinate +x. Hence, the detector mounted printed circuit board 24 is not damaged and is precisely pressed against the front side holder 22 without changing the position of the detector mounted printed circuit board 24.

Figure 15:
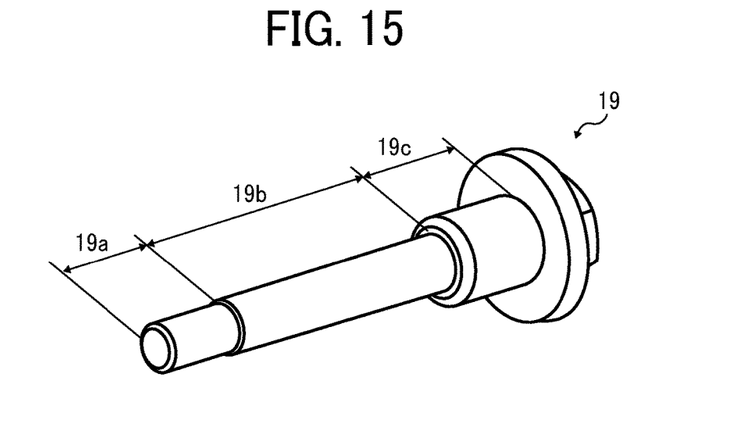
FIG. 15 is a perspective view schematically illustrating an exemplary shape of a stepped screw and each of lengths of steps of the stepped screw according to one embodiment of the present disclosure.

Now, an exemplary stepped screw as a characteristic of the present disclosure is described with reference to FIG. 15 according to one embodiment of the present disclosure. FIG. 15 is a perspective view schematically illustrating a shape and diameters of steps of the stepped screw 19.

That is, a shown there, a pair of stepped screws 19 and 20 is employed in this embodiment of the present disclosure to fasten themselves to the fixed members 15 and 16 as described below in detail. However, since the stepped screws 19 and 20 have substantially the same structure, only the stepped screw 19 fastened to the fixed member 15 is typically illustrated and hereinafter described.

That is, a tip portion 19a of the stepped screw 19 has a male shape to fasten the stepped screw 19 to the fixed member 15. A trunk portion 19b of the stepped screw 19 is tapered having a diameter becoming smaller from a portion bordering the tip portion 19a thereof to a portion bordering a under head portion 19c thereof as the portion becomes closer to the border of the under head portion 19c. The stepped screw 19 has a diameter smaller than an inner diameter of the elastic member (i.e., a compression coil spring 17) while having a length measured from its own base greater than a solid height of the elastic member (i.e., a height of the compression coil spring 17 when the compression coil spring is fully compressed). Hence, the stepped screw 19 acts as a stopper to prevent breakage of the compression coil spring 17. Since the stepped screw 19 has a slope in the longitudinal direction in a range, through which the detector holding unit 14 can move, and presses the front (rear) side holder 22 against the fixed member 15, the stepped screw 19 is ultimately fastened to the fixed member 15 through the front (rear) side holder 22. This provides an idling movement in the depth direction of the apparatus body 101 to the front side holder 22 (and the side holder rear 25).

At the same time (i.e., when the front side holder 22 is pressed from the rear side), the front side holder 22 can be precisely positioned in up and down and left and right directions (i.e., a three axes of an X-axis, a Y-axis, and a Z-axis).

As the detector holding unit 14 moves toward the rear side of the apparatus body 101, a gap between a shaft diameter (of the stepped screw 19) and holes 25q (or 25r) formed in the rear side holder 25 increases thereby increasing a degree of moving freedom of the detector holding unit 14. In addition, when the detector holding unit 14 moves toward the front side of the apparatus body 101, the detector holding unit 14 definitely goes back to an initial position.

The under head portion 19c has also a length greater than the solid height of the compression coil spring 17. Hence, if the detector holding unit 14 moves more than an originally intended movable range, due to a larger diameter of the under head portion 19c as a stopper, such movement is stopped and the detector holding unit 14 cannot further move toward the rear side of the stepped screw 19. Hence, since the detector holding unit 14 cannot further move toward the rear side of the stepped screw 19 while leaving a certain length more than the contact height of the compression coil spring, the compression coil spring 17 does not receive an overload, and consequently, is able to avoid breakage thereof.

Now, a cutaway portion formed in the upper cover 12 and a cutaway portion formed in the front door 9 collectively expose the detector holding unit 14 (i.e., the person detector) are described in detail with reference to FIGS. 16 to 17B and applicable drawings according to one embodiment of the present disclosure.

Figure 16:
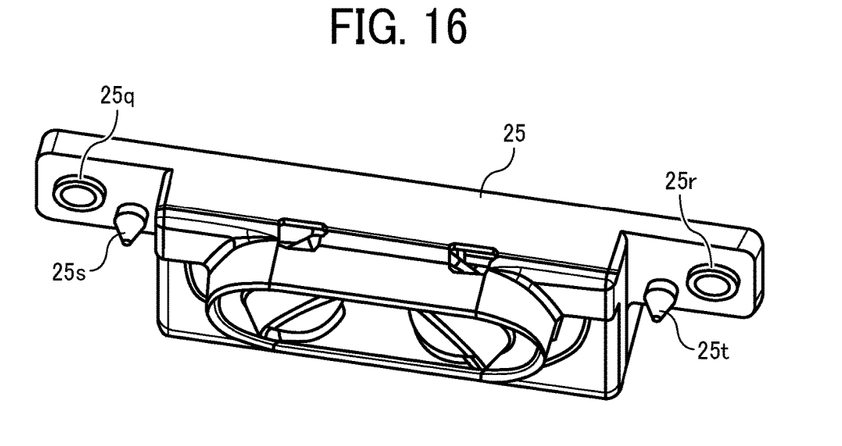
FIG. 16 is a perspective view schematically illustrating an exemplary structure that precisely establishes relative positions of a cutaway portion formed in an upper cover positioned above the person detecting system and a cutaway portion formed in a front door according to one embodiment of the present disclosure.
Figure 17A:
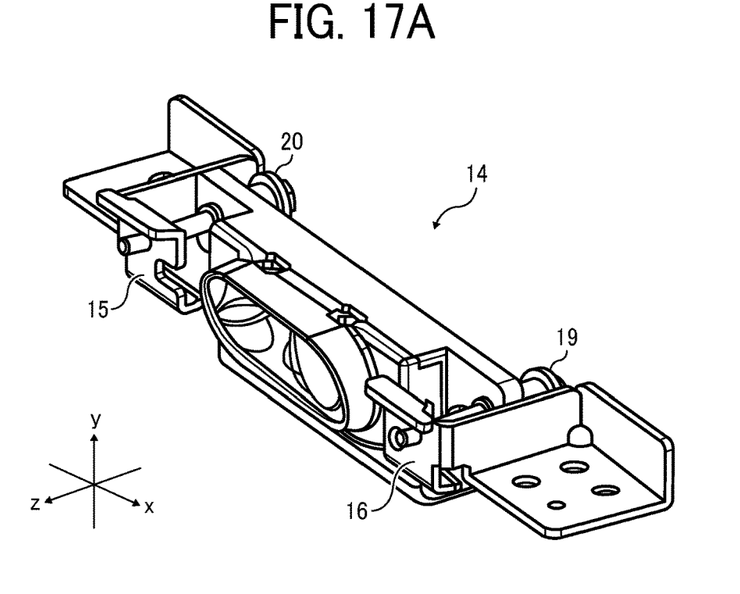
FIGS. 17A and 17B are perspective views collectively illustrating exemplary movement of the detector holding unit to precisely establish the relative positions of a cutaway portion formed in an upper cover positioned above the person detecting system and a cutaway portion of the front door according to one embodiment of the present disclosure.
Figure 17B:
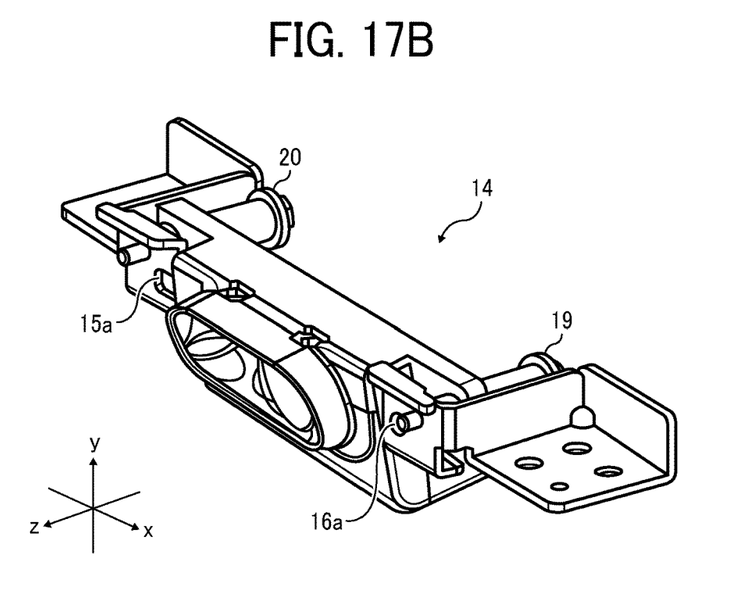

FIGS. 16 to 17B are perspective views collectively illustrating an exemplary structure that precisely positions the cutaway portion formed in the upper cover 12 of the detector holding unit 14 and a cutaway portion formed in the front door 9 according to one embodiment of the present disclosure.

Specifically, the front side holder 22 has a projection with a slope and is pressed and positioned at one side of the apparatus body 101. That is, when the front side holder 22 is pressed and positioned, the front side holder 22 can return to the initial detection position to detect the person, for example. Hence, relative positions of the cutaway portion of the upper cover 12 and that of the front door 9 collectively expose the detector holding unit 14 is accurate, and accordingly interference between the detector holding unit 14 and each of the cutaway portions of the front door 9 and the upper cover 12 can be avoided.

That is, a pair of projections 25s and 25t is formed in the rear side holder 25 and is inserted into an oblong hole 15a and a circular hole 16a formed in the fixed members 15 and 16, respectively. Hence, the rear side holder 25 is positioned in the directions x and y. Consequently, when the front door 9 of the apparatus body 101 is closed, relative positions of the person detecting system 100 and each of the cutaway portions of the front door 9 and the upper cover 12 of the operation unit 6 can be accurate. Accordingly, interference between the person detecting system 100 and these cutaway portions of the front door 9 and the upper cover 12 of the operation unit 6 can be prevented.

Further, each of the projections 25s and 25t has a larger diameter at a base than that of the tip thereof, which is four times of a diameter of the tip thereof. Each of the projections 25s and 25t has a slope having a length that is twice of a linear length thereof. Hence, the detector holding unit 14 is positioned in the directions x and y when the detector holding unit 14 is pressed by the compression coil spring toward the front side F of the apparatus body 101.

However, when the detector holding unit 14 moves over a linear section (of the stepped screw 19), the positions of the detector holding unit 14 in the directions x and y are not fixed. That is, as the detector holding unit 14 moves into the apparatus body 101 in the depth direction thereof, in addition to sliding movement, the detector holding unit 14 can tilt within a gap between the stepped screw and the hole 25q of the front side holder 22. Further, since the projections 25s and 25t have a slope rather than multiple steps, respectively, the detector holding unit 14 can smoothly goes back to the initial detection position to detect the person when the detector holding unit 14 moves toward the front side F while receiving spring pressure.

As described heretofore, various embodiments of the present disclosure typically employ the person detector as a detector. However, the detector can be either a different type detector that detects a foreign object other than the person or an alarming system and the other similar devices as well.

Numerous additional modifications and variations of the present disclosure are possible in light of the above teachings. It is therefore to be understood that within the scope of the appended claims, the present disclosure may be executed otherwise than as specifically described herein. For example, the image forming apparatus is not limited to the above-described various embodiments and modifications may be made as appropriate. Also, the foreign object detecting system is not limited to the above-described various embodiments and modifications may be made as appropriate. Similarly, the method of producing a foreign object detecting system is not limited to the above-described embodiment and may be altered as appropriate. In particular, an order of various steps of the foreign object detecting system producing method is not limited to the above-described embodiment and may be altered as appropriate.

What is claimed is:

1. An image forming apparatus comprising:
    an apparatus body to accommodate an image forming device;
    a foreign object detector to detect a foreign object beside the apparatus body;

a detector holding unit to hold the foreign object detector;
an operating unit;
an upper cover to cover the operating unit;
an image forming device detachably attached to the apparatus body below the operating unit to form an image; and
a front door to cover the image forming device,
wherein the foreign object detector and the detector holding unit are movable together into the apparatus body in a prescribed direction,
wherein a cutaway portion formed in the upper cover and a cutaway portion formed in the front door expose the foreign object detector from between the operating unit and the front door.

2. The image forming apparatus according to claim 1, further comprising
an elastic member to press the detector holding unit from a rear side of the detector holding unit toward a front side of the apparatus body,
wherein the prescribed direction in which the foreign object detector and the detector holding unit are movable together is toward a rear side of the apparatus body.

3. The image forming apparatus according to claim 1, wherein
the detector holding unit includes an elastic portion on one side of the detector holding unit to press the foreign object detector toward an opposite side to the one side in the detector holding unit.

4. The image forming apparatus according to claim 1, further comprising
a fixed member fixed to the apparatus body at a front side of the apparatus body,
wherein the foreign object detector and the detector holding unit constitute a unit and are pressed against the fixed member with the foreign object detector standing upright.

5. The image forming apparatus according to claim 3,
wherein the detector holding unit includes a front side holder and a rear side holder,
wherein the foreign object detector is sandwiched between the front side holder and the rear side holder,
wherein the front side holder includes positioning members to receive and position the foreign object detector in first and second directions of coordinate axes,
wherein the elastic portion is included in the rear side holder,
wherein the rear side holder positions the foreign object detector in a third direction of a coordinate axis when coupled to the front side holder.

6. The image forming apparatus according to claim 1,
wherein the detector holding unit includes a front side holder and a rear side holder,
wherein the front side holder and the rear side holder are fastened by a fastener from a rear side of the rear side holder.

7. An image forming apparatus comprising:
an apparatus body to accommodate an image forming device;
a foreign object detector to detect a foreign object beside the apparatus body; and
a detector holding unit to hold the foreign object detector,
wherein the foreign object detector and the detector holding unit are movable together into the apparatus body in a prescribed direction,
wherein the detector holding unit includes an elastic portion on one side of the detector holding unit to press the foreign object detector toward an opposite side to the one side in the detector holding unit,
wherein the detector holding unit includes a front side holder and a rear side holder,
wherein the foreign object detector includes a sensor and a printed circuit board holding the sensor,
wherein the printed circuit board includes a female connector on a rear side of the printed circuit board, the female connector establishing electrical connection to the foreign object detector,
wherein the elastic portion of the rear side holder cancels a mechanical force applied to the printed circuit board in a prescribed direction by bending in the prescribed direction when a male connector is extracted from the female connector.

8. An image forming apparatus comprising:
an apparatus body to accommodate an image forming device;
a foreign object detector to detect a foreign object beside the apparatus body;
a detector holding unit to hold the foreign object detector;
a fixed member fixed to the apparatus body at a front side of the apparatus body;
an operating unit; and
an upper cover to cover the operating unit,
wherein the foreign object detector and the detector holding unit are movable together into the apparatus body in a prescribed direction,
wherein the foreign object detector and the detector holding unit constitute a unit and are pressed against the fixed member with the foreign object detector standing upright,
wherein the fixed member includes a referenced portion engaging a referencing portion formed in the upper cover of the operation unit to vertically position the upper cover.

9. An image forming apparatus comprising:
an apparatus body to accommodate an image forming device;
a foreign object detector to detect a foreign object beside the apparatus body;
a detector holding unit to hold the foreign object detector;
a fixed member fixed to the apparatus body at a front side of the apparatus body;
an elastic member to press the detector holding unit from a rear side of the detector holding unit toward a front side of the apparatus body; and
a stepped screw to fasten the detector holding unit to the fixed member to press the detector holding unit against the fixed member, wherein the detector holding unit includes a front side holder and a rear side holder,
wherein the foreign object detector and the detector holding unit constitute a unit and are pressed against the fixed member with the foreign object detector standing upright,
wherein the foreign object detector and the detector holding unit are movable together into the apparatus body in a prescribed direction,
wherein the elastic member is a compression coil spring disposed between the rear side holder and a base of the stepped screw,
wherein the stepped screw has a diameter smaller than an inner diameter of the compression coil spring, the stepped screw having a first step including a screw at a tip of the stepped screw to fasten the stepped screw to the fixed member, a second step having a longitudinal slope, and a third step ending at the base of the stepped screw, wherein the third step has a length greater than a height of the compression coil spring when the compression coil spring is fully compressed.

10. The image forming apparatus according to claim 9, wherein the stepped screw has male screw threads at a tip of the stepped screw to fasten the detector holding unit to the fixed member.

11. An image forming apparatus comprising:

an apparatus body to accommodate an image forming device;

a foreign object detector to detect a foreign object beside the apparatus body;

a detector holding unit to hold the foreign object detector; and a fixed member fixed to the apparatus body at a front side of the apparatus body, wherein the foreign object detector and the detector holding unit constitute a unit and are pressed against the fixed member with the foreign object detector standing upright, wherein the foreign object detector and the detector holding unit are movable together into the apparatus body in a prescribed direction, wherein the detector holding unit includes a projection having a slope, wherein the fixed member includes a positioning hole determining a horizontal position of the detector holding unit, wherein the detector holding unit is pressed toward a front side of the apparatus body until the projection fits into the positioning hole of the fixed member and is positioned at the front side of the apparatus body.

12. An image forming apparatus comprising:

an apparatus body to accommodate an image forming device;

a foreign object detector to detect a foreign object beside the apparatus body;

a detector holding unit to hold the foreign object detector;

a fixed member fixed to the apparatus body at a front side of the apparatus body; and a stepped screw to penetrate and fasten the detector holding unit to the fixed member to press the detector holding unit against the fixed member, wherein the foreign object detector and the detector holding unit are movable together into the apparatus body in a prescribed direction, wherein the foreign object detector and the detector holding unit constitute a unit and are pressed against the fixed member with the foreign object detector standing upright, wherein the stepped screw has a longitudinal slope in a range through which the detector holding unit can move.

13. The image forming apparatus according to claim 12, wherein a diameter of the stepped screw is smaller in a range of the stepped screw in which the detector holding unit is movable toward a bottom of the stepped screw.

* * * * *